US007865776B2

(12) United States Patent
Jones et al.

(10) Patent No.: US 7,865,776 B2
(45) Date of Patent: Jan. 4, 2011

(54) ADAPTIVE PREVENTION OF DATA LOSS DURING CONTINUOUS EVENT TRACING WITH LIMITED BUFFER SIZE

(75) Inventors: Scott Thomas Jones, Austin, TX (US);
Frank Eliot Levine, Austin, TX (US);
Milena Milenkovic, Madison, AL (US);
Enio Manuel Pineda, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 684 days.

(21) Appl. No.: 11/923,757

(22) Filed: Oct. 25, 2007

(65) Prior Publication Data

US 2009/0113450 A1    Apr. 30, 2009

(51) Int. Cl.
*G06F 11/00* (2006.01)
(52) U.S. Cl. ........................................ 714/37
(58) Field of Classification Search ............. 714/25–30, 714/33–39, 45–47
See application file for complete search history.

(56) References Cited

U.S. PATENT DOCUMENTS

| | | | | |
|---|---|---|---|---|
| 5,560,036 A | * | 9/1996 | Yoshida | 712/227 |
| 5,996,092 A | * | 11/1999 | Augsburg et al. | 714/38 |
| 6,119,254 A | | 9/2000 | Assouad et al. | |
| 6,279,103 B1 | * | 8/2001 | Warren | 712/227 |
| 6,338,159 B1 | * | 1/2002 | Alexander et al. | 717/128 |
| 6,826,747 B1 | * | 11/2004 | Augsburg et al. | 717/128 |
| 7,281,240 B1 | * | 10/2007 | Cantrill | 717/128 |
| 7,721,076 B2 | * | 5/2010 | Sodani et al. | 712/244 |
| 2003/0135718 A1 | * | 7/2003 | DeWitt et al. | 712/227 |
| 2009/0119548 A1 | * | 5/2009 | Kollmann et al. | 714/45 |

FOREIGN PATENT DOCUMENTS

WO    WO98/45782 A1    10/1998

* cited by examiner

*Primary Examiner*—Nadeem Iqbal
(74) *Attorney, Agent, or Firm*—The Brevetto Law Group

(57) ABSTRACT

This invention describes how to avoid data loss due to limited buffer size during continuous tracing of high frequency events such as branches. Buffer data loss is adaptively avoided by either temporarily patching an instruction with a jump to itself or by using delay loops with an adaptive number of iterations during exception handling in which the trace event is written to the buffer.

14 Claims, 8 Drawing Sheets

Original code

```
loop_start:   add    sum, i
              inc    i
              . . .
              cmp    maxi, i
              jl     loop_start
```

FIG. 3A

Patched code with the artificial jump

```
loop_start:   jmp    loop_start
              inc    i
              . . .
              cmp    maxi, i
              jl     loop_start
```

FIG. 3B

ADAPTIVE PREVENTION OF DATA LOSS DURING CONTINUOUS EVENT TRACING WITH LIMITED BUFFER SIZE

BACKGROUND

1. Field

The present invention relates to computers, and more specifically, to systems, methods and software relating to avoiding buffer data loss during computer diagnostics.

2. Background

Event tracing can be used to better understand the behavior of a computer program or the computer system itself. Event tracing is useful when creating or debugging software, or when analyzing computer hardware, networks or other such systems. Trace data is usually recorded in a limited size buffer in memory and then consumed. Trace consumption refers to any process where the trace data in the buffer is used and the memory space trace data occupies is freed, so that it can be overwritten by new data. For example, a trace consumer may simply write the trace data to a file on a hard disk so that it can be post-processed or it may generate reports based on trace data. The buffer writing function may be triggered by a hardware interrupt or exception. This function needs to execute quickly, because it may prevent high priority interrupts from executing. In the further text of the invention it is assumed that events may be generated using an exception mechanism, although the invention can be applied to systems where events are generated using an interrupt mechanism. To produce long traces, trace records must be written to the file while tracing, thus freeing space in the buffer for newly arriving records. A trace record may be thought of as a record of the behavior of software or other machine executable instructions. Problems may arise in tracing high frequency events (e.g., taken branches) if the file write cannot keep up with buffer write.

One conventional solution to avoid filling up a buffer is to let the trace writer (e.g., the buffer writer) sleep or spin while the trace consumer (e.g., the file writer) frees up some of the buffer space. However, this solution is not applicable to the tracing of events such as branches taken. When the event is a branch taken the buffer writing function is triggered by an exception, and therefore cannot wait long enough for the buffer space to be freed. Hence, if the trace buffer is full, trace records will be lost.

SUMMARY

Embodiments disclosed herein address the above stated needs by providing apparatus, methods and computer software products for dynamically preventing data loss during continuous tracing and writing event tracing records to a buffer during an exception. In accordance with various implementations of these embodiments an event record is detected, and in response it is determined whether or not to adjust the delay loop. The delay loop may be adjusted in response to determining the frequency of events to be above a predetermined threshold. The delay loop is then executed and the event record is written to a buffer before the exception handler ends.

Other embodiments utilize dynamic instruction patching to aid in avoiding the loss of trace records in the buffer. In accordance with various implementations of these embodiments a trace event record may need to be written in response to a particular exception being detected, and in response to the exception it is determined whether the usage level of the buffer for holding the event record exceeds a predetermined threshold. If the buffer usage level is too high an amount of original code is patched to jump to itself and the address of the original code and the original code are stored. This allows as much time as needed for the buffer to empty itself, freeing up sufficient space for the trace event record to be saved in the buffer.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIGS. 3A-B depict an example of code being replaced with a jump to itself in accordance with the second embodiment of FIG. 2A;

DETAILED DESCRIPTION

Figure 1A:
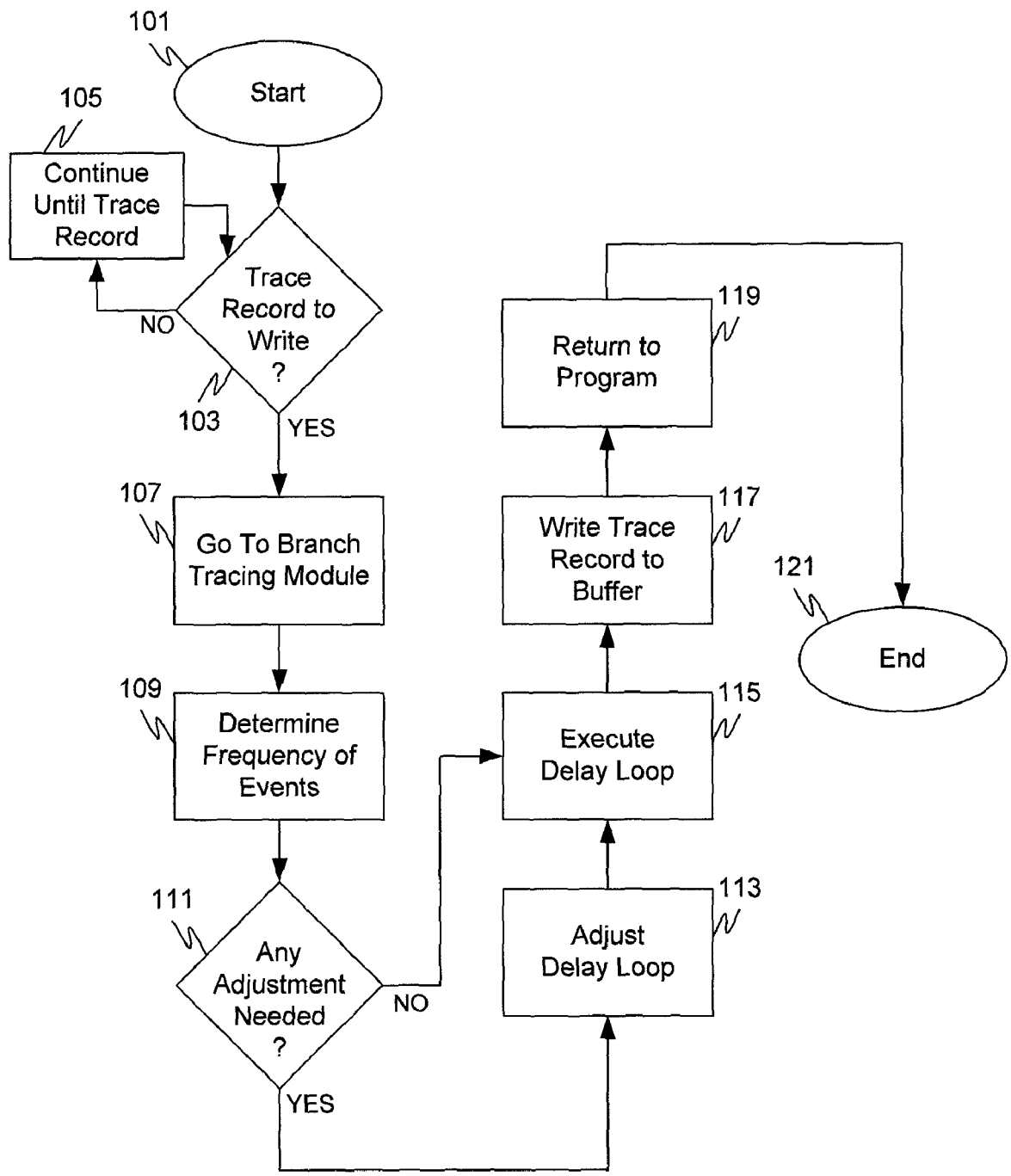
FIG. 1A is a flowchart of a method according to a first embodiment for adaptively prolonging execution of the buffer writing function during an exception.

The various embodiments may be implemented in a number of different ways. For example, code for implementing various activities may be embodied in a module or routine which is performed in conjunction with the program being monitored or system being evaluated. The two main approaches to dynamically prevent data loss during continuous tracing involve dynamic instruction patching and the use of delay loops (or other types of delays) with an adaptive number of iterations. Aspects of these two approaches may be combined in an implementation to prevent data loss during continuous tracing. Dynamic instruction patching, illustrated in the exemplary embodiment of FIG. 2A, avoids the loss of trace records for the user space and most of the kernel code. The use of delay loops with an adaptive number of iterations, illustrated in the exemplary embodiment of FIG. 1A, provides more time between buffer writes to aid in tracing kernel code without losses. Both of these approaches are applicable to prevent buffer overflow during high frequency exception trace events such as traces of branches.

An exception event causes the temporary stopping of the current program or routine in order to execute a higher priority exception handling subroutine. Typically, the exception mechanism in the CPU executing the program or routine forces a branch out of the current program/routine to an exception handler subroutine. When the exception handler finishes execution, the program that caused the exception continues to execute. A branch instruction is an instruction that may change sequential flow of instructions, e.g., cause a program to jump to another sequence of instructions. If a branch instruction causes a change in the control flow, it is called a taken branch. Most modern processors have hardware support to detect an exception on every branch (e.g., IBM's PowerPC architecture) or on every taken branch (e.g., Intel's IA32 architecture) This exception mechanism can be used by a program such as an operating system module to produce a branch trace.

Figure 1B:
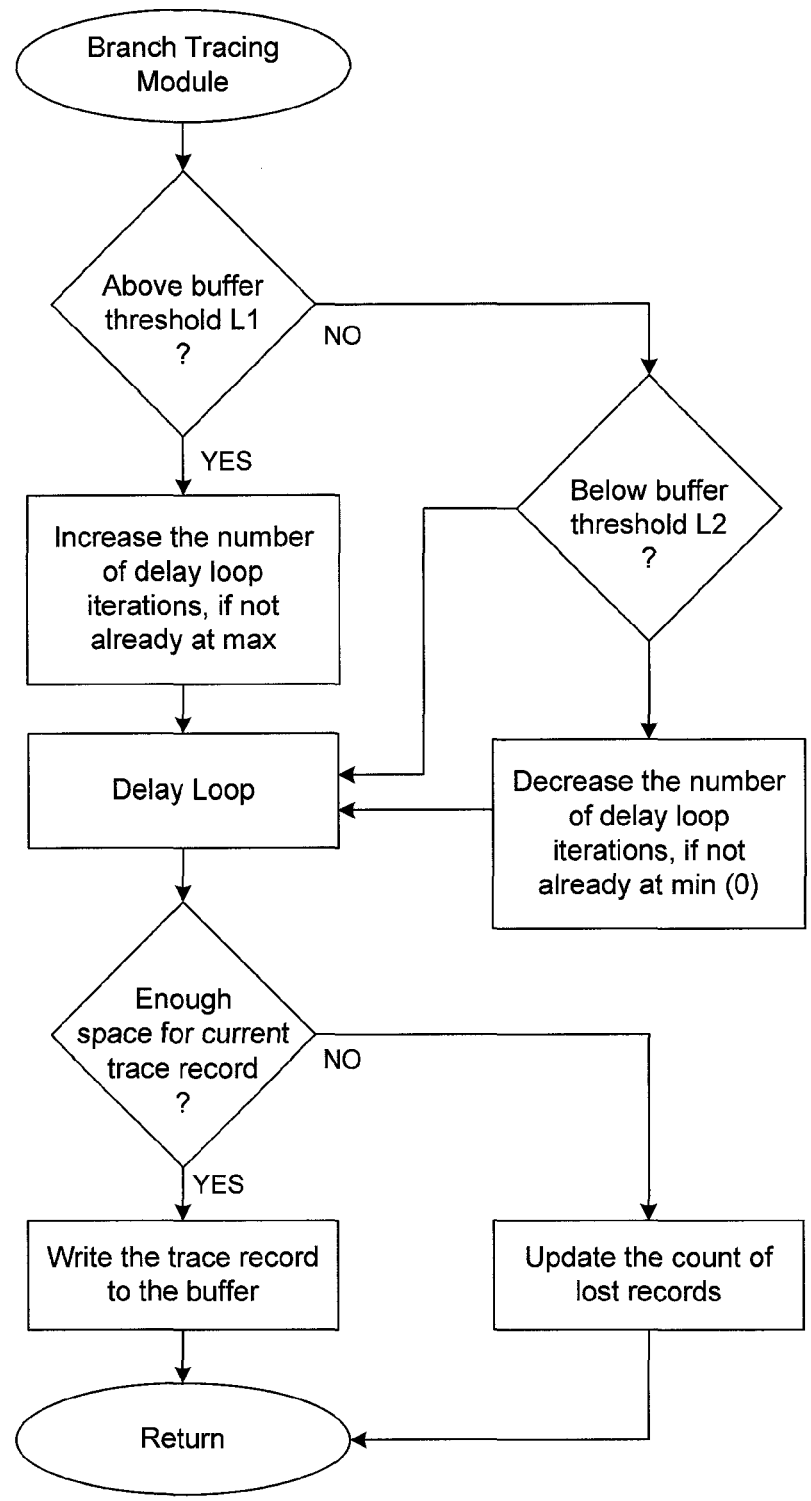
FIG. 1B is a flowchart of software logic for the embodiment disclosed in FIG. 1A.

FIG. 1A is a flowchart of a method according to a first embodiment for adaptively prolonging execution of the buffer writing function during exception handling. FIG. 1B is a flowchart of software logic for the embodiment disclosed in FIG. 1A. FIGS. 1A-B illustrating a control flow of a branch tracing module, which is called from an exception handler on every branch when tracing. The method of FIG. 1A begins at 101 and proceeds to 103 to determine whether there is an event trace record to write when an exception is detected. The event record may be a trace record of an event such as a record of a branch taken by the program. If there is no trace record the method proceeds along the "NO" path to 105 to continue with the existing program until such time that there is a trace record to write. Back in 103, upon detecting a trace record to be written, the method proceeds along the "YES" path to 107.

In 107, in response to detecting the trace record to be written the execution of the program typically proceeds to a branch tracing module. In some implementations the code for carrying out this embodiment may be programmed into the software in a format other than a module. In such instances the execution proceeds to the routine, code or other logic that adaptively prolongs execution of the buffer writing function according to the embodiment. For the purposes of explaining the various embodiments herein, the software where this takes place is called the branch tracing module. The method proceeds from 107 to 109 to detect the frequency of tracing events (e.g., branches). This may be done by determining an amount of elapsed time, or clock cycles, for a given number of previous branch tracing events. This may be done in the branch tracing module or elsewhere in the software other than the branch tracing module, in which case a variable may be passed to the branch tracing module indicating the frequency of events.

Once the frequency of tracing events has been determined in 109 the method passes to 111 to determine whether any adjustment is need for the delay loop. The function or branch tracing module may include a special delay loop with an adaptively determined number of iterations. Although the delay time is limited by virtue of taking place during exception handling, the time it takes to write an event to the trace buffer can be prolonged by at least a predetermined amount. If the event frequency is determined to be relatively high the number of delay loop iterations can be increased. This results in feeding events to the trace buffer more slowly, thus keeping the trace recording on pace with the trace consuming such as writing to the trace file. As the frequency of events decreases, the number of delay loop iterations may be adjusted downward.

If it is determined in 111 that the delay should be adjusted the method proceeds along the "YES" path to 113. In block 113 the delay is adjusted depending upon the frequency of events determined in 109 or the state of the program, the branch tracing module, or the system. For example, the delay time may, in some embodiments, be solely based on the frequency of events. In other embodiments the delay may be based on the frequency of events, while also taking into consideration the rate at which the buffer is being read from, that is, the rate at which the file writer is accepting data from the buffer. Another factor that may be used in adjusting the delay loop is the amount of unused capacity in the buffer. If the buffer has an acceptable margin of unused space the delay need not be adjusted. However, if the buffer is running low on storage capacity and is possibly in danger of filling up, the delay loop may be increased so as to slow down the writing to the buffer. The delay may be adjusted by dynamically changing the number of delay loop iterations. This may be done at the beginning of each execution of the buffer writing function. This approach differs from conventional systems that change the number of iterations of a typical spin loop, which is usually determined by an externally set condition. The number of delay loop iterations can range from zero to the maximum number which still allows the system to function properly.

Once the delay has been adjusted the method proceeds from 113 to 115. In regards to 111 again, if it had been determined that the delay did not need adjustment, the method would have proceeded from 111 along the "NO" path to 115. A delay loop in this case may be implemented as a simple loop construct with the number of iterations being determined by a program variable. An empty loop body, or a body that executes dummy instructions, may be used to provide the delay. In 115 the delay loop is executed. The method then proceeds to 117 to write the trace record to the buffer. The writing of the trace record to the buffer occurs during the exception handling, and in some embodiments, is performed in response to executing the delay loop. Upon completing the writing of the trace record the method proceeds from 117 to 119 to return from the branch tracing module to the main program or other portion of software from which the execution came. The method then proceeds to 121 and ends.

FIG. 1B is a flowchart of software logic for the embodiment disclosed in FIG. 1A. Execution of the buffer writing function is adaptively prolonged by introducing a special delay loop with an adaptively determined number of iterations. Although the amount of delay time during exception handling is limited, the time it takes to write an event to the trace buffer can be prolonged by a predetermined amount.

The delay can be controlled in response to different parameter measurements. For example, the frequency of event to be traced—tracing events—can be used to set the delay. The number of delay loop iterations is increased for high frequency events, so that events are arriving into the trace buffer more slowly and the trace recording is kept in balance with writing to the trace file When the frequency of events decreases, the delay loop may execute a smaller number of times. Alternatively, the delay loop can vary as a function of how far behind is the writing to disk. Typically, with this approach there is an upper limit on the number of delay loop iterations, so some trace records may still be lost on some systems.

Figure 2A:
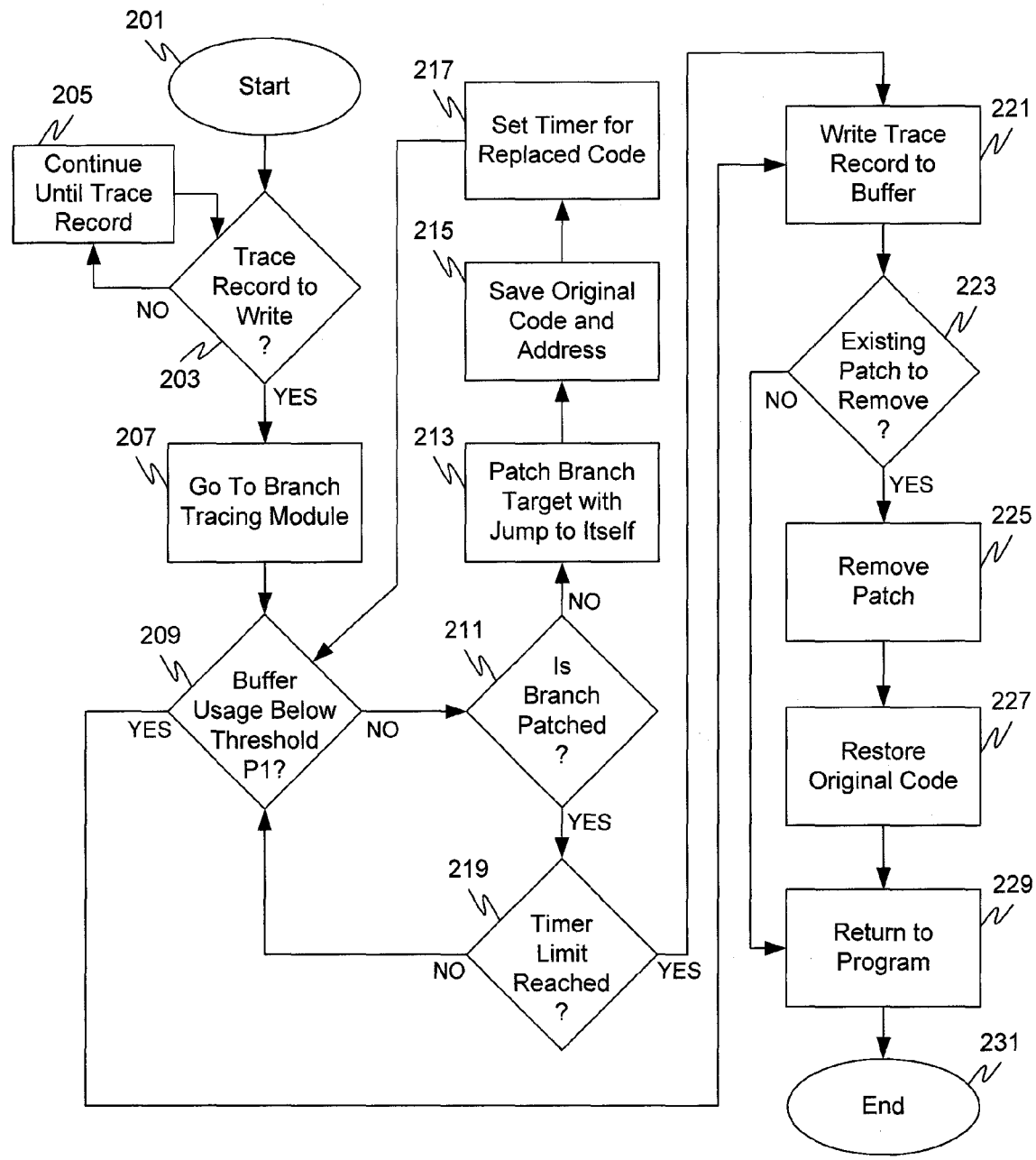
FIG. 2A is a flowchart of a method according to a second embodiment using delay loops with an adaptive number of iterations to delay buffer writing during an exception.

FIG. 2A is a flowchart of a method according to a second embodiment of using delay loops to delay buffer writing during exception handling. The method begins at 201 and proceeds to 203 to determine whether there is a trace record to be written when an exception is detected. If there is no trace record to be written the method proceeds along the "NO" path to 205 until such time as a trace record is detected. Once it is determined in 203 that there is a trace record to be written the method proceeds from 203 along the "YES" path to 202. In block 207 the instruction execution is passed from the main program (or current subprogram, routine, module, or the like) to the branch tracing module—that is, the program goes to the branch tracing module. The method then proceeds to 209.

In 209 it is determined whether there is sufficient available buffer space available so that a patch branch is not needed. In some embodiments the system may detect whether or not the buffer is filled above a predetermined threshold Pt. If there is sufficient memory space and no adjustments are necessary, for example, if the level of buffer memory usage is less than threshold P1, the method proceeds from 209 along the "YES" path to 221 to write the trace record to the buffer. The writing of the trace record to the buffer is done during the exception handling. In some embodiments the writing of the trace record may be performed in response to the storing of the original code, subject to the current buffer usage being below a predefined threshold. Back in 209, if it is determined that the amount of available buffer memory has reached a predetermined threshold level P1 the method proceeds from 209 along "NO" path to 211. In block 211 it is determined whether or not the branch is already patched. If it is determined in 211 that the branch has not been patched the method proceeds from 211 along the "NO" path to 213. In some embodiments more than one section of code may be patched, in which case block 211 may detect the amount of code that has already been patched, rather than determining whether or not any patch currently exists. In such an embodiment, the method may proceed from 211 to 213 to patch more code so long as the amount of patched code was at or below an acceptable level.

In block 213 an amount of code is removed and replaced with a jump back to itself. In this way, the original code will not be executed yet, and instead a small amount of delay is introduced before more data is written to the buffer. For example, let the original code be a loop which ends with a conditional jump jl to the loop_start as depicted in FIGS. 3A-B. The branch tracing module writes the corresponding branch trace record into a trace buffer and just returns if the number of bytes in the buffer is below a given threshold. In the example of FIGS. 3A-B the instruction add sum, i is replaced with an unconditional jump to loop_start. The code shown in FIGS. 3A-B illustrates one exemplary embodiment for controlling flow of the branch tracing module with delay loop which is inserted in the program instead of the original code.

Returning to 213, once this block is completed the method proceeds to 215 to save the original code and address. For example, referring to the code of FIG. 3A-B, the tracing module saves the loop_start address and the original code in a temporary storage location, so the original code can be restored when the number of bytes in the trace buffer is below the threshold P2. The thresholds P1 and P2 do not have to be the same. For example, one threshold may trigger the patch and a different, lower threshold may trigger the restore. Upon completing 215 the method proceeds to 217.

In some embodiments each section of replaced code may have a timer associated with it, so that after a certain number of cycles it gets restored automatically. The timer helps to prevent the case where replaced code is never executed again because the program moved on, for example, if target instructions enter the pipeline and begin execution before being replaced in the last loop iteration. Moreover, for some embodiments, in response to the tracing being turned off, all of the patched code in processes still running is restored to the original code. In 217 the replaced code timer is set. Upon completing 217 the method proceeds back to 209.

Returning to again review the paths of block 211, in the event it is determined that the branch has already been patched the method proceeds from 211 along the "YES" path to 219. In 219 it is determined whether the timer limit, which was set in block 217, has been reached. If the timer limit has not yet been reached the method returns via the "NO" path back to 209. However, if it is determined in 219 that the timer limit has been reached the method proceeds from 219 via the "YES" path to 221. In 221 the trace record, in queue since block 203, is written to the buffer. If block 221 is entered from a timeout condition in block 219, rather than from 209, the buffer is typically checked for available buffer space before writing the trace record to the buffer. If there is no more space, that record will be lost. This situation can generally be avoided by setting a reasonably low buffer threshold, that is, the threshold that is checked in block 209 to determine whether there is enough buffer capacity to allow writing the trace record.

Once 221 is completed the method proceeds to 223 to determine whether there is an existing patch to remove, for example, a patch branch added and code saved previously in blocks 213-215. If there is no existing patch the method proceeds along the "NO" path to 229. However, if it is determined in 223 that there is an existing patch to remove the method proceeds along the "YES" path to 225 to remove the patch. Upon completing 225 the method proceeds to 227 to restore the original codes previously saved in 215. Once the original code is restored the method proceeds to 229 to return the program execution to the main program, or other point, from which it branched back in 207. The method then proceeds to 231 and ends.

Figure 2B:
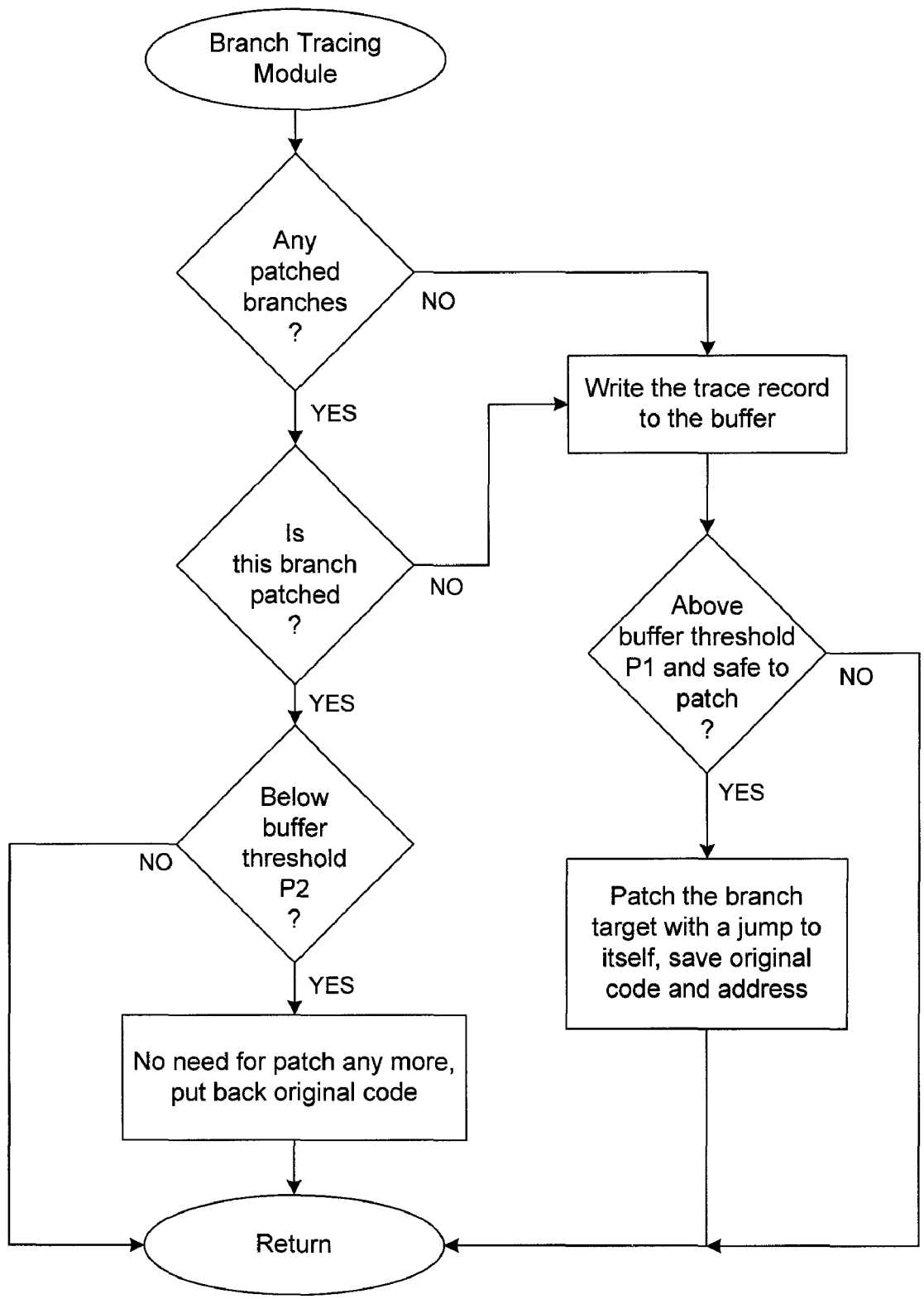
FIG. 2B is a flowchart of software logic for the embodiment disclosed in FIG. 2A.

FIG. 2B is a flowchart of software logic for the embodiment disclosed in FIG. 2A. In accordance with this embodiment when the trace buffer is filled up to a given threshold and an event is detected, a part of executable code of the application being traced is dynamically replaced with an unconditional jump to itself. This jump prevents the application from proceeding until enough of the trace buffer is written to the file, as determined by the amount of buffer memory being used falling below a threshold level P2. On some systems it may be necessary to ensure that the patched instructions are going to execute instead of the original code, for example by flushing the instruction cache memory. On some systems it may be necessary to ensure that the patched instructions are going to execute instead of the original code, for example by flushing the instruction cache memory. Upon detecting the buffer below threshold P2, the jump will be replaced with the original code. The "artificial" jump will not be recorded in the trace, since it will be recognized as inserted by tracing system and not originated from the application. This approach has the advantage of slowing down the user application side and not affecting the exception handler. Typically, this approach can be applied to most but not all of the kernel code. For example, the kernel code needed for file writing is not dynamically replaced, since this action may cause a deadlock.

FIGS. 3A-B depicts an example of code being replaced with a jump to itself in accordance with the second embodiment of FIG. 2A. The original code in the example depicted in FIGS. 3A-B is a loop which ends with a conditional jump jl to the loop_start. The branch tracing module writes the corresponding branch trace record into a trace buffer, and returns if it is determined that the number of bytes in the buffer is below a given threshold P1. However, if the threshold P1 is reached the tracing module replaces the jump target at loop_start address if the code is safe to patch (e.g., the kernel code for file writing is not safe to replace since replacing it may cause a deadlock). For the example shown in FIGS. 3A-B the instruction add sum, i, is replaced with an unconditional jump to loop_start. The tracing module saves the loop_start address and the original code in a temporary storage location so the original code can be restored upon detecting the number of bytes in the trace buffer to be below the threshold P2. The thresholds P1 and P2 do not have to be the same. For example, one threshold may trigger the patch and a different lower one may trigger the restore.

Figure 4A:
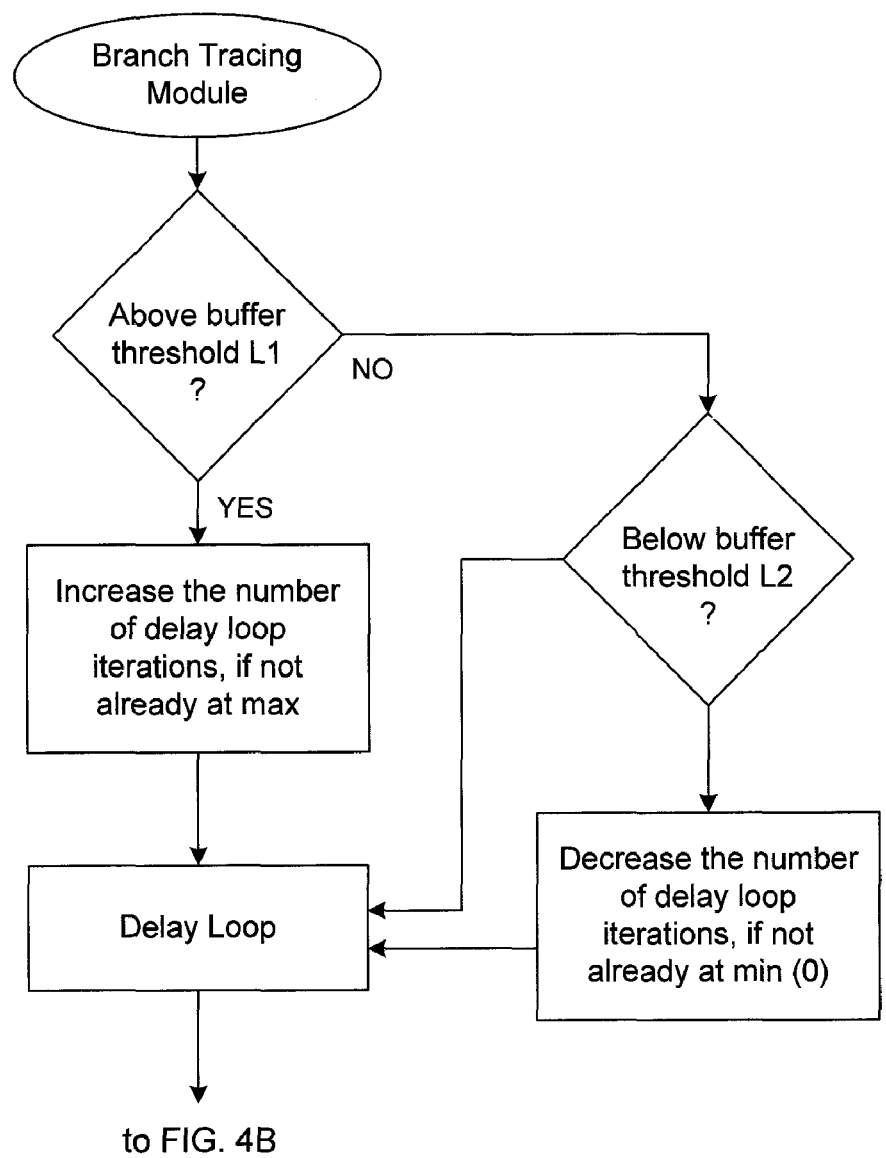
FIGS. 4A-B are flowcharts of software logic for a combination of the embodiments disclosed in FIG. 1A and FIG. 2A.
Figure 4B:
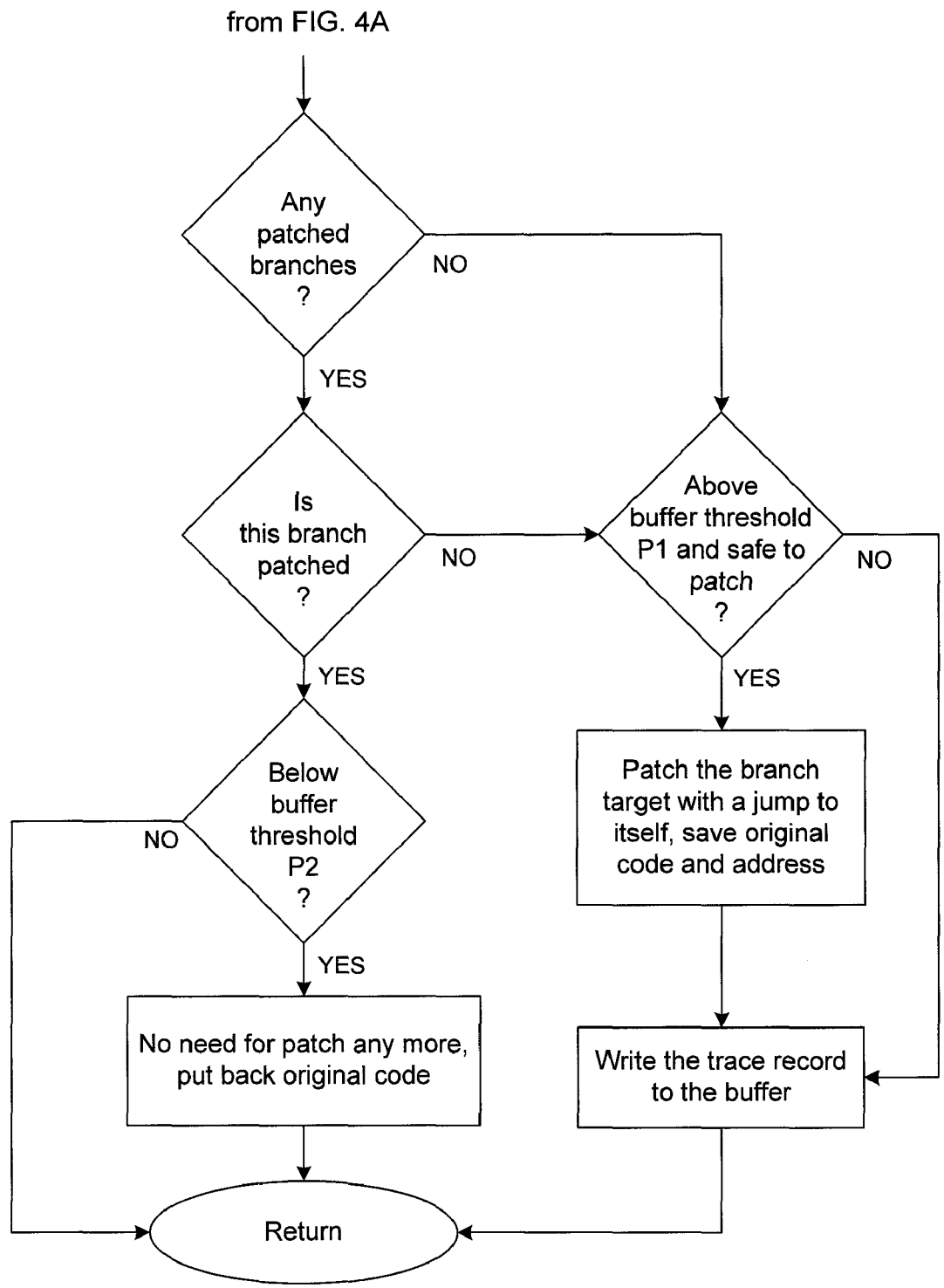

FIG. 4 is a flowchart of software logic for a combination of the embodiments disclosed in FIG. 1A and FIG. 2A. With the dynamic patching, the thresholds are typically selected to be low enough so that trace records for branches in sensitive kernel sections are not lost (e.g., sensitive meaning not safe to patch). Combination of two approaches will ease the pressure to the trace buffer. The upper threshold for dynamic patching, P1, can be selected to be the same or greater than the upper threshold for adaptive delay loops, L1. In this way, the delay loops do not execute unless sensitive code is traced.

Figure 5:
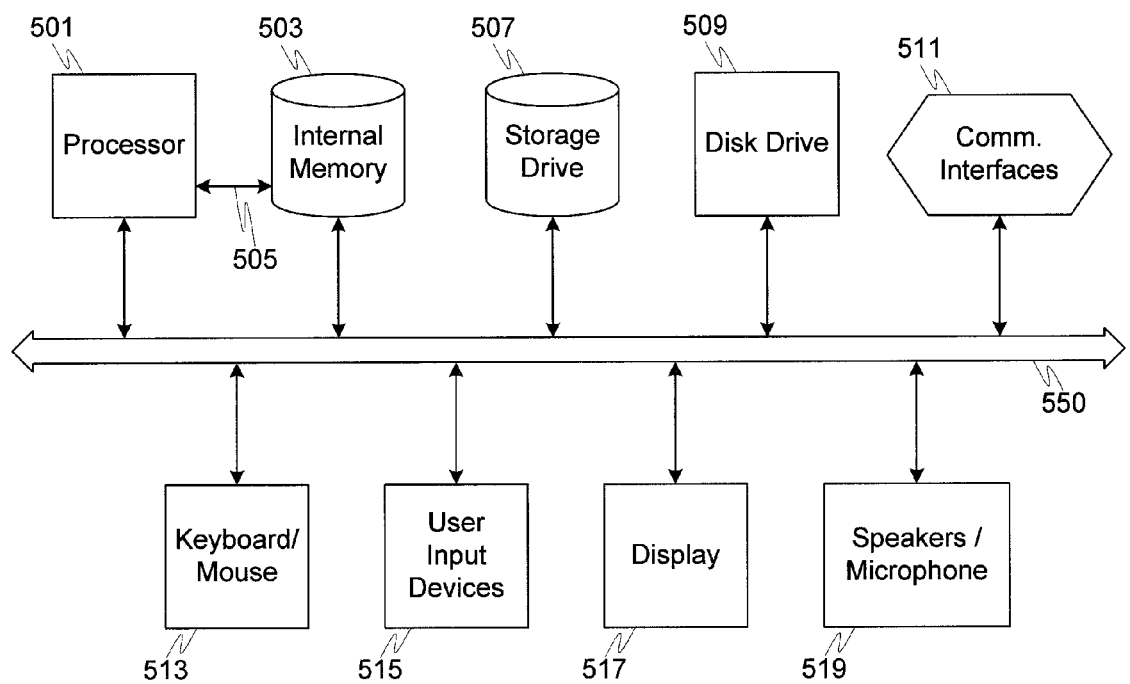
FIG. 5 is an exemplary information handling system configured to implement various embodiments of the invention.

FIG. 5 depicts an exemplary information handling system suitable for use with various embodiments of the invention. The computer system 500 includes a processor 501 that may be embodied as a microprocessor or central processing unit (CPU). The processor 501 is typically configured to access an internal memory 503 via a bus such as the system bus 550. The internal memory 503 may include one or more of random access memory (RAM), read-only memory (ROM), cache memory, or a combination of these or other like types of circuitry configured to store information in a retrievable format. The internal memory 503 may be configured either as part of the processor 501, or separate from it but within the same packaging. The processor 501 may be able to access internal memory 503 via a different bus than the bus used to access the various computer components. For example, processor 501 may access internal memory 503 via local bus 505, or via control lines or other communication links.

The computer system 500 also typically includes, or has access to, one or more storage drives 507 and floppy disk drives 509. The storage drive 507 is typically a hard disk drive configured for the storage and retrieval of data, computer programs or other information. The floppy disk drives 509 may include a combination of several disc drives of various formats that can read and/or write to removable storage media (e.g., CD-R, CD-RW, DVD, DVD-R, floppy disk, etc.). The computer system 500 may either include the storage drives 507 and floppy disk drives 509 as part of its architecture (e.g., within the same cabinet or enclosure), as connected peripherals, or may access the storage drives 507 and floppy disk drives 509 over a network, or a combination of these. The storage drive 507 is often used to store the software, instructions and programs executed by the computer system 500.

The computer system 500 may include communication interfaces 511 configured to be communicatively connected to the Internet, a local area network (LAN), a wide area network (WAN), or connect with other devices using protocols such as the Universal Serial Bus (USB), the High Performance Serial Bus IEEE-1394 and/or the high speed serial port (RS-232). The components of computer system 500 may be interconnected by a bus 550 and/or may include expansion slots conforming to any of various industry standards such as PCI (Peripheral Component Interconnect), ISA (Industry Standard Architecture), or EISA (enhanced ISA). In addition to the bus 550 the computer system 500 may include one or more other buses, control lines or communication links—either wired or wireless—interconnecting the components.

Typically, the computer system 500 includes one or more user input/output devices such as a keyboard and/or mouse 513, or other means of controlling the cursor (e.g., touchscreen, touchpad, joystick, trackball, etc.) represented by the user input devices 515. A display 517 is also generally included as part of the computer system 500. The display may be any of several types of displays, including a liquid crystal display (LCD), a cathode ray tube (CRT) monitor, a thin film transistor (TFT) array, or other type of display suitable for displaying information for the user. The display 517 may include one or more light emitting diode (LED) indicator lights, or other such display devices. In addition, most computer systems 500 also include, or are connected to, one or more speakers and microphones 519 for audio output and input. Speech recognition software may be used in conjunction with the microphones 519 to receive and interpret user speech commands.

Those of ordinary skill in the art would know that the embodiments disclosed herein may be configured in various manners to suit specific situations or design consideration, yet still fall within the scope of the disclosed invention. For example, in some implementations of FIG. 1A the block 111 (and 113) determination of whether any adjustment is needed to the delay loop may take place after executing the delay loop 113 and writing the trace record to the buffer, block 117. Another typical variation is found in FIG. 2A in which one of the blocks (e.g., 219-227) may include an activity of adjusting the timer value to as needed to enhance the efficiency of the branch tracing module. Another activity in any of the embodiments disclosed herein may be to allow for the adjustment of the thresholds P1 and/or P2. Various activities may be included or excluded as disclosed above, or performed in a different order, with the rest of the activities still remaining within the scope of at least one exemplary embodiment. For example, blocks 105 and 205 may be omitted, or rephrased to indicate that the main program continues its normal course of operation until such time that a trace record is detected for writing. In some embodiments the writing of the trace record in block 117 may be performed before the delay loop is executed in 115 or adjusted in 113.

The invention may be implemented with any sort of processing units, processors and controllers (e.g., processor 501 of FIG. 5) capable of performing the stated functions and activities. For example, the processor 501 may be embodied as a microprocessor, microcontroller, DSP, RISC processor, or any other type of processor that one of ordinary skill would recognize as being capable of performing the functions described herein. A processing unit in accordance with at least one exemplary embodiment can operate computer software programs stored (embodied) on computer-readable medium such as the memory 503, e.g. hard disk, CD, flash memory, RAM, or other computer readable medium as recognized by one of ordinary skill in the art, or the computer software programs may be transmitted wirelessly to the processing unit. The computer software programs can aid or perform the steps and activities described above. For example computer programs in accordance with at least one exemplary embodiment may include: source code for determining the frequency of events 109, source code for determining whether any adjustment is need to the delay loop 111, source code for adjusting the delay loop 113, source code for executing the delay loop 15, source code for writing a trace record to the buffer 117, and source code for any other such activities disclosed herein. There are many further source codes that may be written to perform the stated activities and procedures disclosed herein, and these are intended to lie within the scope of exemplary embodiments.

The use of the word "exemplary" in this disclosure is intended to mean that the embodiment or element so described serves as an example, instance, or illustration, and is not necessarily to be construed as preferred or advantageous over other embodiments or elements. The description of the various exemplary embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the spirit and scope of the present invention.

What is claimed is:

1. A method of preventing data loss for an exception write function associated with event tracing and trace consumption, the method comprising:

detecting an event record to be written during exception handling;

determining a usage level of a buffer for holding the event record;

replacing original code with a jump to itself in response to the determining of the usage level, said replacing being executed during the exception handling;

storing, during the exception handling, the original code and an address of the original code in response to the replacing of the original code;

adjusting an exception delay in response to the determining of the usage level;

executing the exception delay; and writing the event record to said buffer during the exception handling.

2. The method of claim 1, wherein the event record is a trace record of an event comprising a branch taken by a program.

3. The method of claim 1, wherein the usage level is a first usage level, the software product further comprising:

determining a second usage level of the buffer in response to the replacing of the original code.

4. The method of claim 3, further comprising:

restoring said original code to the address during the exception handling;

wherein the restoring of the original code is performed in response to said determining of the second usage level.

5. A software product for preventing data loss for an exception write function associated with event tracing and trace consumption, the software product comprising a machine readable storage medium including a program of instructions, wherein the program of instructions upon being executed on a device causes the device to perform activities comprising:

detecting an event record to be written during exception handling;

determining a first usage level of a buffer for holding the event record;

replacing original code with a jump to itself in response to the determining of the first usage level, said replacing being executed during the exception handling;

storing the original code and an address of the original code in response to the replacing of the original code; and writing the event record to the buffer during exception handling in response to the storing of the original code.

6. The software product of claim 5, wherein the event record is a trace record of an event comprising a branch taken by a program.

7. The software product of claim 5, wherein the usage level is a first usage level, the software product further comprising:

determining a second usage level of the buffer in response to the replacing of the original code.

8. The software product of claim 7, further comprising:

restoring said original code to the address during the exception handling;

wherein the restoring of the original code is performed in response to said determining of the second usage level.

9. A method of preventing data loss for an exception write function associated with event tracing, the method comprising:

detecting an event record to be written during exception handling;

determining whether to adjust an exception delay;

executing the exception delay; and writing the event record to a buffer during the exception handling.

10. The method of claim 9, wherein said determining whether to adjust the exception delay comprises determining a frequency of events, the method further comprising:

adjusting the exception delay in response to the determining of said frequency.

11. The method of claim 9, wherein said exception delay is executed during the exception handling.

12. A software product for preventing data loss for an exception write function associated with event tracing, the software product comprising a machine readable storage medium including a program of instructions, wherein the program of instructions upon being executed on a device causes the device to perform activities comprising:

detecting an event record to be written during exception handling;

determining whether to adjust an exception delay;

executing the exception delay; and writing the event record to a buffer during the exception handling.

13. The software product of claim 12, wherein said determining whether to adjust the delay comprises determining a frequency of events, the method further comprising;

adjusting the delay in response to the determining of said frequency.

14. The software product of claim 12, wherein said delay is executed during the exception handling.

* * * * *